June 17, 1969     J. D. BRAUGHT     3,450,302

RECEPTACLE OF MOLDED PLASTIC MATERIAL

Filed April 4, 1968

INVENTOR
JOHN D. BRAUGHT
ATTYS.

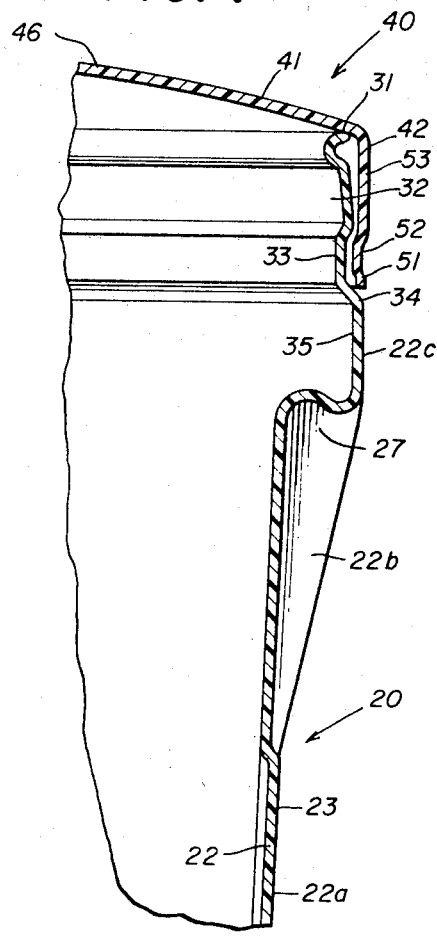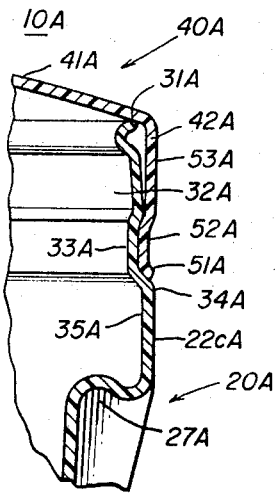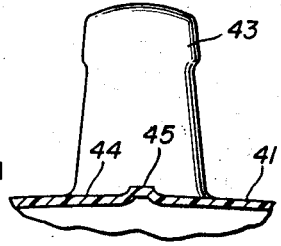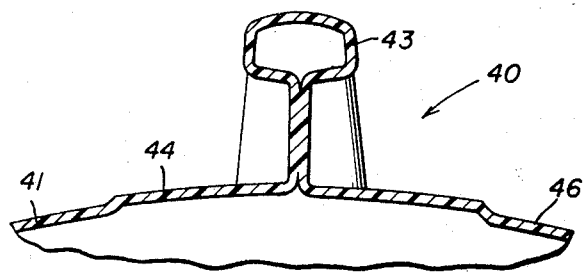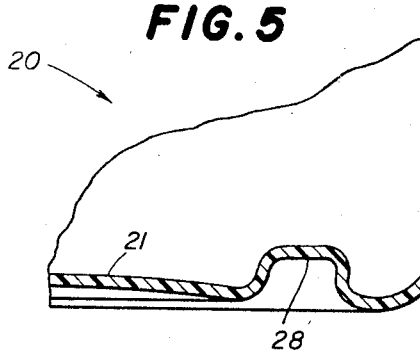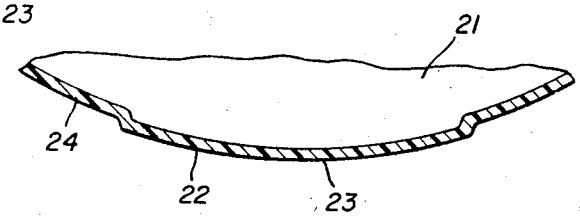

United States Patent Office 3,450,302
Patented June 17, 1969

3,450,302
RECEPTACLE OF MOLDED PLASTIC MATERIAL
John D. Braught, Northbrook, Ill., assignor to United States Steel Corporation, Pittsburgh, Pa., a corporation of Delaware
Continuation-in-part of application Ser. No. 578,788, Sept. 12, 1966. This application Apr. 4, 1968, Ser. No. 718,748
Int. Cl. B65d 43/10, 11/06
U.S. Cl. 220—60
12 Claims

ABSTRACT OF THE DISCLOSURE

There is disclosed a receptacle of separable two-piece construction comprising a lower body of deep bucket-like configuration and an upper cover of shallow dish-like configuration, wherein the body is of one-piece molded construction and formed of linear high-density polyethylene and the cover is of one-piece molded construction and formed of linear high-density polyethylene; improved closure elements are provided on the body and the cover which cooperate to accommodate ready placement and removal of the cover with respect to the top of the body.

---

This application is a continuation-in-part of the copending application Ser. No. 578,788, filed Sept. 12, 1966, for Waste Receptacle of Molded Plastic Material.

The present invention relates to a receptacle of separable two-piece construction comprising a lower body of deep bucket-like configuration and an upper cover of shallow dish-like configuration, wherein the body is of one-piece molded construction and formed of plastic material and the cover is of one-piece molded construction and formed of plastic material, and wherein the cooperating elements of the body and of the cover are of improved arrangement and disposition so as to accommodate ready placement and removal of the cover with respect to the top of the body and so as to prevent accidental displacement of the cover from the top of the body.

It is a general object of the invention to provide a receptacle of the character noted that is of improved and simplified construction and arrangement and that is economical to manufacture.

Another object of the invention is to provide a receptacle of the character noted, wherein the upper portion of the side wall of the body and the rim of the cover carry cooperating structural elements that cause the cover when it is initially placed upon the top of the side wall to descend slowly into a supported final closed position upon the top of the side wall.

Further features of the invention pertain to the particular construction and arrangement of the elements of the receptacle, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 4 is an enlarged fragmentary sectional view of the top portion of the receptacle body and the supported receptacle cover, this view being taken in the direction of the arrows along the line 4—4 in FIG. 1;

FIG. 5 is an enlarged fragmentary sectional view of the bottom of the receptacle body, this view being taken in the direction of the arrows along the line 5—5 in FIG. 1;

FIG. 6 is an enlarged fragmentary sectional view of the receptacle cover and an end view of the handle carried thereby, this view being taken in the direction of the arrows along the line 6—6 in FIG. 1;

FIG. 7 is an enlarged fragmentary sectional view of the receptacle cover and the handle carried thereby, this view being taken in the direction of the arrows along the line 7—7 in FIG. 1;

FIG. 8 is an enlarged fragmentary sectional view of the side wall of the receptacle body, this view being taken in the direction of the arrows along the line 8—8 in FIG. 1; and FIG. 9 is a view similar to FIG. 4 illustrating a modification of the receptacle.

Figure 1:
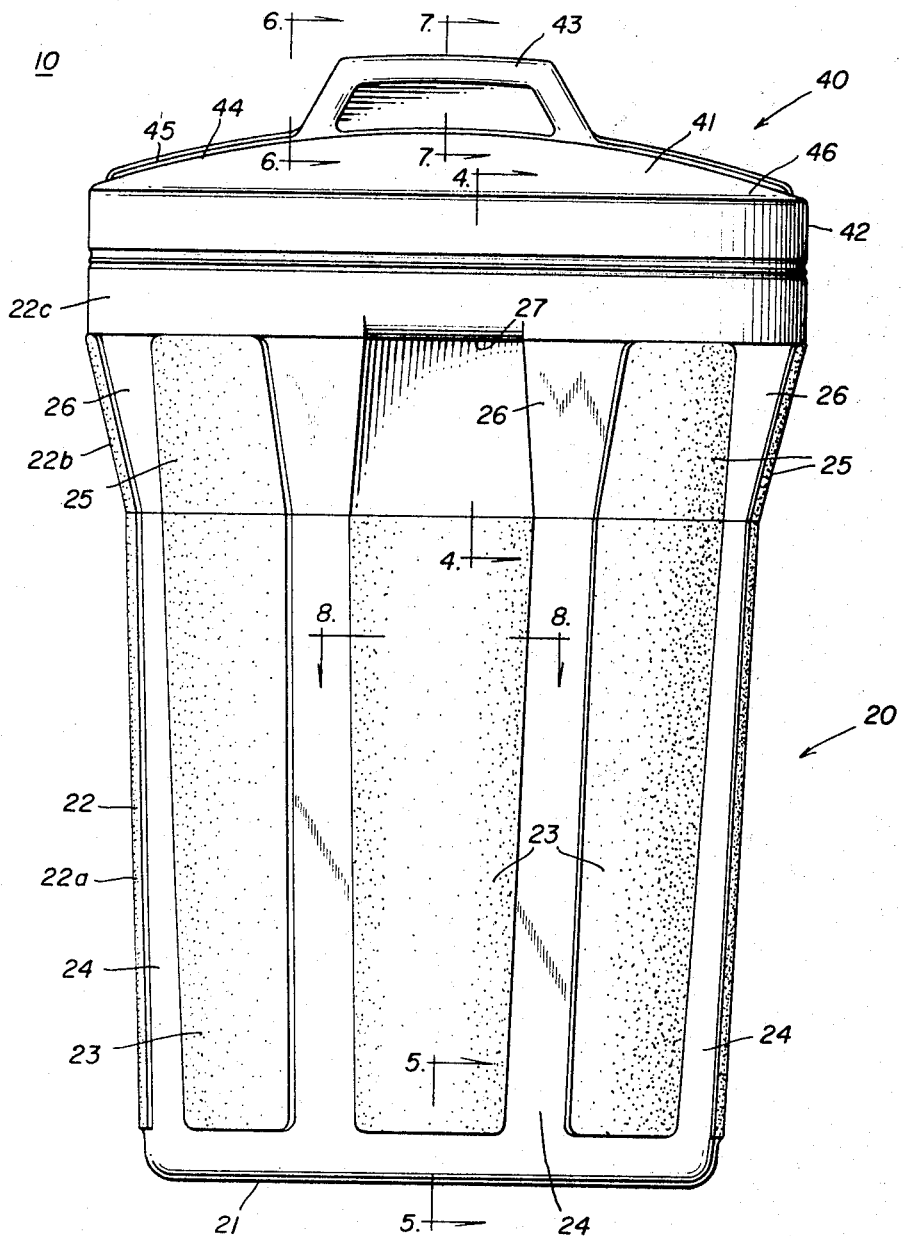
FIGURE 1 is a side elevational view of a receptacle of separable two-piece construction comprising a lower body and an upper cover, and embodying the present invention.
Figure 2:
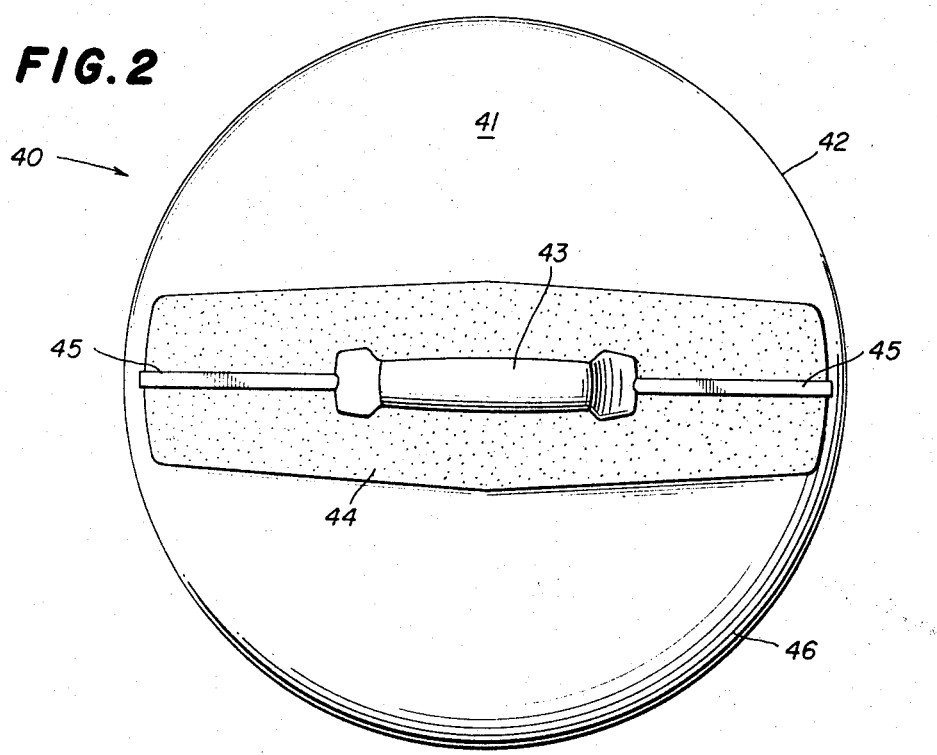
FIG. 2 is a top view of the receptacle cover.
Figure 3:
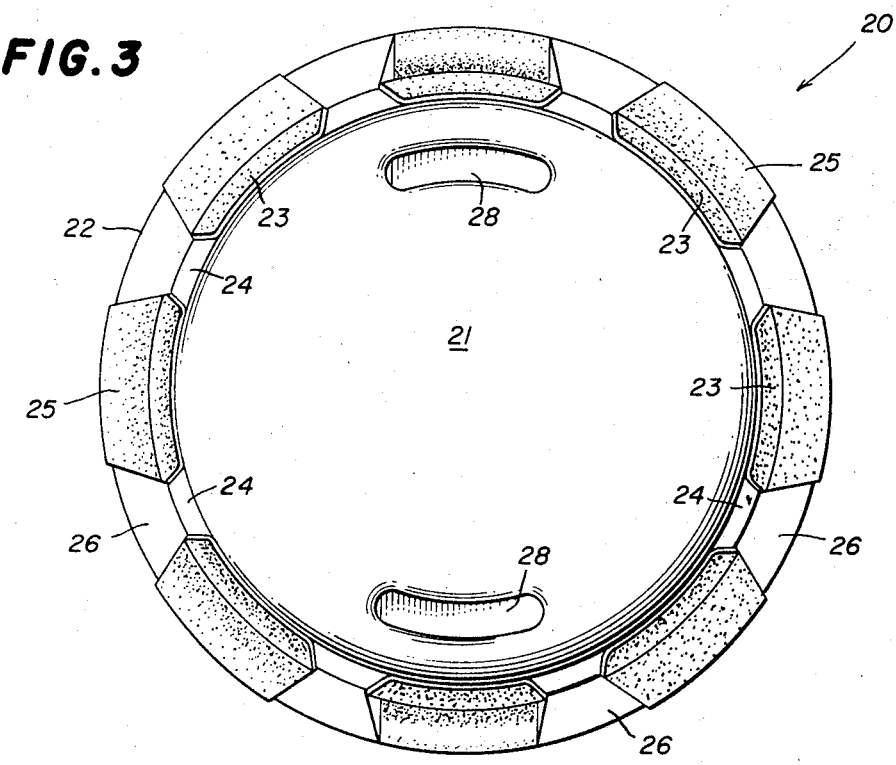
FIG. 3 is a bottom view of the receptacle body.

Referring now to FIGS. 1 to 8, inclusive, of the drawings, the receptacle 10 there illustrated and embodying the features of the present invention is of two-piece construction comprising a lower body 20 of deep bucket-like configuration, and an upper cover 40 of shallow dish-like configuration. The receptacle 10 may be used advantageously as a waste receptacle, a clothes hamper, a storage receptacle, and the like, the form of the receptacle illustrated in the drawing being particularly advantageously used as a waste receptacle. The body 20 is of one-piece molded construction and formed of synthetic organic resin and including a substantially disk-like bottom wall 21 and a generally cylindrical side wall 22 upstanding from the perimeter of the bottom wall 21. The cover 40 is of one-piece molded construction and formed of synthetic organic resin and including a substantially disk-like top wall 41 and a generally cylindrical rim 42 depending from the perimeter of the top wall 41. Preferably, both the body 20 and the cover 40 consist essentially of linear high-density polyethylene. The linear high-density product may be produced by the Ziegler "low pressure" polymerization process and is characterized by a specific gravity in the range 0.941 to 0.965. Such linear high-density polyethylene possesses physical properties that are ideally suitable to its utilization as the plastic material of which the receptacle 10 of the present invention is molded, as explained more fully hereinafter.

More particularly, the side wall 22 comprises a lower section 22a, of relatively small diameter, an upper section 22c of relatively large diameter, and an intermediate section 22b of variable diameter between that of the lower section 22a and that of the upper section 22c. Specifically, the bottom of the intermediate section 22b joins the top of the lower section 22a, and the top of the intermediate section 22b joins the bottom of the upper section 22c; whereby the intermediate section 22b is of frusto-conical configuration. The lower section 22a comprises a plurality of upstanding textured panels 23 and a plurality of upstanding plain panels 24 arranged in alternate circumferentially spaced-apart relation; and the intermediate section 22b comprises a plurality of upstanding textured panels 25 and a plurality of upstanding plain panels 26 arranged in alternate circumferentially spaced-apart relation. In the arrangement, the tops of the panels 23 join the bottoms of the adjacent panels 25, and the tops of the panels 24 join the bottoms of the adjacent panels 26; whereby the panels 23-25 comprise composite textured panels on the sections 22a and 22b, and the panels 24-26 comprise composite plain panels on the sections 22a and 22b. Also, the panels 23 project radially outwardly somewhat from the adjacent panels 24, and the panels 25 project radially outwardly somewhat from the adjacent panels 26. This panel arrangement is not only very attractive in appearance, but lends some desired stiffness to the side wall 22.

Two diametrically disposed handle depressions 27 are formed in the section 22b respectively adjacent to the tops of the two corresponding ones of the panels 23, and two diametrically disposed finger-grip depressions 28 are formed in the bottom wall 21 respectively adjacent to the bottoms of the two panels 23 mentioned. This arrangement is very advantageous, since it accommodates ready lifting and moving of the receptacle 10 employing either coordinate set of the depressions 27–28.

The top wall 41 is substantially dome-shaped, it being upwardly convex; and the top central portion thereof carries an upwardly directed handle 43 formed integrally therewith. The handle 43 extends laterally with respect to the top wall 41; and a laterally extending textured panel 44 is carried by the top wall 41 below the handle 43. Also, a pair of aligned and laterally extending ribs 45 are carried by the top wall 41 at the opposite ends of the handle 43. In the arrangement, the panel 44 projects upwardly somewhat above the main part 46 of the top wall 41, and the ribs 45 project upwardly somewhat above the panel 44. This arrangement of the panel 44 and the ribs 45 is pleasing in appearance and adds some desired stiffness to the cover 40; while the handle 43 facilitates ready placement and removal of the cover 40 with respect to the top of the body 20.

In the receptacle 10, the extreme top of the upper section 22c is open to define a top opening into the body 20, and the extreme bottom of the rim 42 is open to define a bottom opening into the cover 40; and the outside diameter of the upper section 22c adjacent to the top opening is somewhat smaller than the inside diameter of the rim 42 adjacent to the bottom opening so as to accommodate ready placement and removal of the cover 40 with respect to the top of the body 20 and so as to accommodate the support of the cover 40 in a final closed position upon the top of the body 20 with the top wall 41 closing the top opening into the upper section 22c and with the rim 42 in surrounding relation with respect to the upper section 22c, as illustrated in FIGS. 1 and 4.

Considering the construction of the upper section 22c in greater detail, an annular body lip 31, serving as a stiffening rib to stiffen the top of the body 20, is carried by the top thereof and disposed radially inwardly of the rim 42 and positioned in engagement with the adjacent annular portion of the top wall 41, when the cover 40 occupies its supported final closed position, as shown in FIG. 4. An annular body flange 32 is carried by the upper portion of the upper section 22c immediately below the body lip 31 and extends downwardly and radially outwardly from the bottom of the body lip 31; the lowermost part of the body flange 32 interconnects with the top edge of an indented body ring 33, carried by the upper portion of the upper section 22c immediately below the body flange 32 and extending downwardly and radially inwardly from the bottom of the body flange 32. An annular body shoulder 34 is carried by the upper portion of the upper section 22c and extends downwardly and radially outwardly from the bottom of the body ring 33. The bottom of the body shoulder 34 joins the adjacent substantially cylindrical main wall portion 35 of the upper section 22c. In the arrangement illustrated in FIG. 4, each of the elements 31, 32, 33 and 34 has a diameter that is smaller than that of the main wall portion 35.

Considering the construction of the cover 40 in greater detail, an annular cover lip 51 is carried by the bottom of the rim 42 and positioned a short distance from the body shoulder 34, when the cover 40 occupies its supported final closed position, as shown in FIG. 4. An indented cover ring 52 is carried by the lower portion of the rim 42 immediately above the cover lip 51 and extends upwardly and radially inwardly from the top of the cover lip 51. The cover ring 52 projects radially inwardly toward the body ring 33 with the inner surface of the cover ring 52 positioned a short distance from the outer surface of the body ring 33, when the cover 40 occupies its supported final closed position, as shown in FIG. 4.

It will be noted from FIG. 4 that the inner diameter of the cover ring 52 is substantially equal to the outer diameter of the lowermost portion of the body flange 32, i.e., at the juncture between the body flange 32 and the body rim 33. As a consequence, when the cover 40 is initially placed on top of the body 20, the cover lip 51 readily passes over the outer surface of the body flange 32, but there is frictional engagement between the inner surface of the cover ring 52 and the outer surface of the body flange 32, whereby to guide the cover 40 as it descends into its supported final closed position, as shown in FIG. 4. The cover 40 has sufficient weight to overcome the frictional resistance between the above noted contacting surfaces of the cover ring 52 and the body flange 32 to cause the cover 40 to descend under the action of gravity from its initially placed positioned upon the top of the body 20 into its supported final closed position, as shown in FIG. 4.

In the arrangement as shown, the cover 40 in its supported final closed position is carried by the upper section 22c by virtue of the engagement of the elements 31 and 41 as clearly shown in FIG. 4; which engagement is obtained by the correlated dimensions of the respectively cooperating elements of the upper section 22c and the cover 40. Specifically, the vertical distance between the body shoulder 34 and the top of the body lip 31 matches the vertical distance between the bottom of the cover lip 51 and the lower surface of the top wall 41 just radially inwardly of the top of the rim 42; the locations of the body ring 33 and of the cover ring 52 are matched when the cover 40 occupies its supported final closed position; and the outside diameter of the body ring 33 is only slightly smaller than the inside diameter of the cover ring 52. This fit of the elements noted causes the cover 40 to fit over the upper section 22c, when the cover 40 occupies its supported final closed position, as shown in FIG. 4. Also, this fit of these elements causes the cover 40 to descend slowly from its initially placed position upon the top of the upper section 22c into its supported final closed position illustrated, since air must escape from the interior of the receptacle 10 to the exterior and between the outer surfaces of the upper section 22c and the inner surfaces of the rim 42, as the cover 40 descends into its supported final closed position. Moreover, with such an arrangement of the elements of the receptacle, if the receptacle is supported on its side, as, for example, if the receptacle is accidentally upset, the cover ring 52 substantially fully enters into the indented body ring 33 at the point of receptacle support, thereby locking the cover in position on the body and preventing spilling of the contents of the receptacle.

In a constructional embodiment of the receptacle 10, designed as a 20 gallon container, the side wall 22 had an overall height from a support to the top of the body lip 31 of 24"; the lower section 22a had a height of 19⁷⁄₃₂"; the intermediate section 22b had a height of 2½"; the upper section 22c had a height of 2⁹⁄₃₂"; the lower section 22a had an inside diameter at the bottom wall 21 of 14"; the lower section 22a had an inside diameter at the junction with the intermediate section 22b of 18¹³⁄₁₆"; the upper section 22c had an inside diameter at the junction with the intermediate section 22b of 19⁹⁄₃₂"; and the upper section 22c had a diameter across the top of the body lip 31 of 18³⁄₁₆". The rim 42 had an overall height between the bottom of the cover lip 51 and the junction with the top wall 41 of 2⁹⁄₃₂"; the top wall 41 had a crown height of 1²³⁄₆₄"; and the handle 43 stood 2¼" above the top of the crown of the top wall 41. The inner diameter of the cover ring 52 was 19¹⁄₃₂". In this construction, the bottom wall 21, the side wall 22 and the top wall 21 had a common thickness in the range 0.070" to 0.080" and the molded plastic material consisted of linear high-density polyethylene. The dimensions of the other elements of the receptacle 10 not specified were substantially that of the scale of the drawings.

By virtue of the upwardly and radially outward taper of the side wall 22, it will be appreciated that a plurality of the bodies 20 may be readily stacked in nested relation with each other, thereby to conserve space in shipping and storing the empty bodies 20.

In view of the above description of the construction of the receptacle 10, it will be appreciated that the same is well suited to manufacture utilizing the blow-molding method, whereby a parison of linear high-density polyethylene may be enclosed in a separable mold and then blown to form an integral container consisting of the body 20, the cover 40, and a connecting section, not shown. Subsequently, the container is removed from the mold after opening thereof; and then the connecting section is cut-away so as to define the body 20 and the cover 40 in separate condition. In the cutting-away of the connecting section, the body lip 31 and the cover lip 51 are defined; whereby the cover 40 thus produced may be placed upon the body 20 thus produced and then moved into its supported final position, as illustrated in FIG. 4.

There is illustrated in FIG. 9 of the drawings a modification of the receptacle designated 10A, the modification differing only in certain respects from the receptacle 10 shown in FIGS. 1 to 8, whereby like reference numerals have been applied to like parts with the addition of the suffix A. It is further pointed out that FIG. 9 is a view in vertical section like FIG. 4 showing the cover 40A and the body 20A of the receptacle 20A in the engaged portions thereof. In addition, the body 20A is identical in construction to the body 20 described above, whereby further description thereof will not be here repeated.

Considering the construction of the cover 40A in FIG. 9, an annular cover lip 51A is carried by the bottom of the rim 42A and positioned in engagement with the body shoulder 34A, when the cover 40A occupies its supported final closed position, as shown in FIG. 9. A cover ring 52A is carried by the lower portion of the rim 42A immediately above the cover lip 51A and extends upwardly and radially inwardly from the top of the cover lip 51A. The cover ring 52A projects radially inwardly into the body ring 33A with the inner surface of the cover ring 52A positioned in engagement with the outer surface of the body ring 33A, when the cover 40A occupies its supported final closed position, as shown in FIG. 9.

When the cover 40A is initially placed on top of the body 20A, the outer surface of the body flange 32A engages the inner surface of the cover lip 51A; and the cover 40A has sufficient weight to cause the same to descend under the action of gravity from its initially placed position upon the top of the body 20A into its supported final closed position and with the outer surface of the body flange 32A engaging and guiding the cover lip 51A as the cover 40A descends, as noted above, into its supported final closed position, as shown in FIG. 9.

In the arrangement, the cover 40A in its supported final closed position is carried by the upper section 22cA by virtue of the simultaneous engagements of the elements 31A, 41A, 45A, 51A, 33A and 52A, as clearly shown in FIG. 9; which simultaneous engagements are obtained by the correlated dimensions of the respectively cooperating elements of the upper section 22cA and the cover 40A. Specifically, the vertical distance between the body shoulder 34A and the top of the body lip 31A matches the vertical distance between the bottom of the cover lip 51A and the lower surface of the top wall 41A just radially inwardly of the top of the rim 42A; the locations of the body ring 33A and of the cover ring 52A are matched when the cover 40A occupies its supported final closed position; and the outside diameter of the body ring 33A is only slightly smaller than the inside diameter of the cover ring 52A. This fit of the elements noted causes the cover 40A snugly to fit the upper section 22cA, when the cover 40A occupies its supported final closed position, as shown in FIG. 9. Also, this fit of these elements causes the cover 40A to descend slowly from its initially placed position upon the top of the upper section 22cA into its supported final closed position illustrated, since air must be forced from the interior of the receptacle 10A to the exterior and between the outer surfaces of the upper section 22cA and the inner surfaces of the rim 42A, as the cover 40A descends into its supported final closed position.

In a constructional embodiment of the receptacle 10A, designed as a 32 gallon container, the side wall had an overall height from a support to the top of the body lip 31A of 27$^{29}/_{32}$"; the lower section had a height of 18¾"; the intermediate section had a height of 5"; the upper section 22cA had a height of 4$^{5}/_{32}$"; the lower section had an inside diameter at the bottom wall of 17"; the lower section had an inside diameter at the junction with the intermediate section of 18⅜"; the upper section 22cA had an inside diameter at the junction with the intermediate section 22b of 20$^{31}/_{32}$"; and the upper section 22cA had a diameter across the top of the body lip 31A of 20½". The rim 42A had an overall height between the bottom of the cover lip 51A and the junction with the top wall 41A of 2$^{9}/_{32}$"; the top wall 41A had a crown height of 1$^{21}/_{32}$"; and the handle stood 2¼" above the top of the crown of the top wall 41A. In this construction, the bottom wall, the side wall and the top wall had a common thickness in the range 0.070" to 0.080" and the molded plastic material consisted of linear high-density polyethylene. The dimensions of the other elements of the receptacle 10A not specified were substantially that of the scale of the drawings.

In view of the foregoing, it is apparent that there has been provided a receptacle of separate two-piece construction comprising a lower body of deep bucket-like configuration and an upper cover of shallow dish-like configuration, wherein the body is of one-piece molded structure and formed of synthetic organic resin, wherein the cover is of one-piece molded structure and formed of synthetic organic resin, and wherein the structures of the body and the cover are coordinated to accommodate ready placement and removal of the cover with respect to the top of the body and with respect to cover relation therewith.

Receptacles of other than circular cross section may, of course, be produced and incorporating the novel and useful elements of the invention as above-described in connection with the illustrated, generally cylindrical article.

What is claimed is:

1. A receptacle comprising a molded plastic, open-top body comprising a bottom and side walls having top portions defining an upper body section for supporting a cover, and a molded plastic cover adapted to receive the upper body section and comprising a top wall and a rim depending from the periphery of the top wall and terminating in a cover lip, said upper body section being provided with a peripherally extending, indented body ring adjacent to and spaced from the body top and projecting radially inwardly of the body, an upper edge portion of the body ring interconnecting with a lowermost portion of a body flange extending upwardly of the body ring and inwardly of the body and terminating in a body lip, the cover rim being provided with a peripherally extending, indented cover ring adjacent to the cover lip and projecting inwardly of the rim and adapted to engage, in substantially line contact manner, the outer surface of the lowermost portion of the body flange when the cover is positioned on the body, the rim having a height such that, when the cover is in a final, closed position on the body, the cover ring is disposed concentrically outwardly of the body ring and the cover is supported, in an upright receptacle position, by the body lip.

2. A receptacle in accordance with claim 1, wherein the body lip comprises a body top stiffening rib, extending peripherally of the body top and disposed inwardly of the lowermost part of the body flange.

3. A receptacle in accordance with claim 2, wherein the cover ring, in a final, closed position of the cover on the body, is spaced outwardly of the body ring whereby, when the receptacle is supported on its side, the inwardly projecting cover ring substantially fully enters the indented body ring at the point of receptacle support to lock the cover in place on the body.

4. A receptacle in accordance with claim 3, wherein the body side walls comprise a lower body section wherein the side walls thereof are connected, at the lower extremities thereof, to the bottom and extend upwardly and outwardly thereof and are connected, at the upper extremities thereof, to the upper body section, whereby a plurality of said body articles are nestable with each other.

5. A receptacle in accordance with claim 4, wherein the body side walls comprise an intermediate body section wherein the upper extremities of the intermediate section walls are connected to the upper body section side walls and the lower extremities thereof are connected to the lower body section side walls and extend upwardly therefrom and outwardly of the bottom at an angle from the vertical greater than that of the lower section side walls, and wherein at least two oppositely disposed limited portions of the junction between the intermediate section walls and the upper section walls are indented inwardly of the junction to provide means for lifting the receptacle.

6. A receptacle in accordance with claim 5 wherein the receptacle is of generally circular cross section.

7. A receptacle of separable two-piece construction comprising a lower body of deep bucket-like configuration and an upper cover of shallow dish-like configuration, said body being of one-piece molded construction and formed of synthetic organic resin and including a bottom wall and a generally cylindrical side wall upstanding from the perimeter of said bottom wall, said cover being of one-piece molded construction and formed of synthetic organic resin and including a top wall and a generally cylindrical rim depending from the perimeter of said top wall, the extreme top of said side wall being open to define a top opening into said body and the extreme bottom of said rim being open to define a bottom opening into said cover, the outside diameter of said side wall adjacent to said top opening being somewhat smaller than the inside diameter of said rim adjacent to said bottom opening so as to accommodate the support of said cover in a final closed position upon the top of said body with said top wall closing said top opening and with said rim in surrounding relation with respect to the upper portion of said side wall, an annular body lip carried by the top of said side wall and disposed radially inwardly of said rim and engaging the adjacent annular portion of said top wall when said cover occupies its supported final closed position, an annular body flange carried by the upper portion of said side wall immediately below said body lip and extending downwardly and radially outwardly from the bottom of said body lip, a body ring carried by the upper portion of said side wall immediately below said body flange and extending downwardly and radially inwardly from the bottom of said body flange, an annular body shoulder carried by the upper portion of said side wall immediately below said body ring and extending downwardly and radially outwardly from the bottom of said body ring, an annular cover lip carried by the bottom of said rim and disposed opposite said body shoulder when said cover occupies its supported final closed position, and a cover ring carried by the lower portion of said rim immediately above said cover lip and extending upwardly and radially inwardly from the top of said cover lip, said cover ring projecting radially inwardly toward said body ring with the inner surface of said cover ring being disposed opposite the outer surface of said body ring when said cover occupies its supported final closed position, the outer surface of said body flange having substantially the same diameter as the inner surface of said cover ring, whereby the outer surface of said body flange engages the inner surface of said cover ring when said cover is initially placed on top of said body, said cover having sufficient weight to cause the same to descend under the action of gravity from its initially placed position upon the top of said body into its supported final closed position with the outer surface of said body flange engaging and guiding said cover ring as said cover descends as aforesaid into its supported final closed position.

8. The receptacle set forth in claim 7, wherein both said body and said cover consist essentially of linear high-density polyethylene.

9. The receptacle set forth in claim 7, wherein said side wall comprises a lower section of relatively small diameter, an upper section of relatively large diameter, and an intermediate section having a relatively small diameter at the bottom thereof and joining the top of said lower section and having a relatively large diameter at the top thereof and joining the bottom of said upper section, and said cover is carried by said upper section when it occupies its supported final closed position.

10. A waste receptacle of separable two-piece construction comprising a lower body of deep bucket-like configuration and an upper cover of shallow dish-like configuration, said body being of one-piece molded construction and formed of synthetic organic resin and including a bottom wall and a generally cylindrical side wall upstanding from the perimeter of said bottom wall, said cover being of one-piece molded construction and formed of synthetic organic resin and including a top wall and a generally cylindrical rim depending from the perimeter of said top wall, the extreme top of said side wall being open to define a top opening into said body and the extreme bottom of said rim being open to define a bottom opening into said cover, the outside diameter of said side wall adjacent to said top opening being somewhat smaller than the inside diameter of said rim adjacent to said bottom opening so as to accommodate the support of said cover in a final closed position upon the top of said body with said top wall closing said top opening and with said rim in surrounding relation with respect to the upper portion of said side wall, an annular body lip carried by the top of said side wall and disposed radially inwardly of said rim and engaging the adjacent annular portion of said top wall when said cover occupies its supported final closed position, an annular body flange carried by the upper portion of said side wall immediately below said body lip and extending downwardly and radially outwardly from the bottom of said body lip, a body ring carried by the upper portion of said side wall immediately below said body flange and extending downwardly and radially inwardly from the bottom of said body flange, an annular body shoulder carried by the upper portion of said side wall immediately below said body ring and extending downwardly and radially outwardly from the bottom of said body ring, an annular cover lip carried by the bottom of said rim and engaging said body shoulder when said cover occupies its supported final closed position, and a cover ring carried by the lower portion of said rim immediately above said cover lip and extending upwardly and radially inwardly from the top of said cover lip, said cover ring projecting radially inwardly into said body ring with the inner surface of said cover ring engaging the outer surface of said body ring when said cover occupies its supported final closed position, the outer surface of said body flange engaging the inner surface of said cover lip when said cover is initially placed on top of said body, said cover having sufficient weight to cause the same to descend under the action of gravity from its initially placed position upon the top of said body into its supported final closed position with the outer surface of said body flange engaging and guiding said cover lip as said cover descends as aforesaid into its supported final closed position.

11. The waste receptacle set forth in claim 10, wherein both said body and said cover consist essentially of linear high-density polyethylene.

12. The waste receptacle set forth in claim 10, wherein said side wall comprises a lower section of relatively small diameter, an upper section of relatively large diameter, and an intermediate section having a relatively small diameter at the bottom thereof and joining the top of said lower section and having a relatively large diameter at the top thereof and joining the bottom of said upper section, and said cover is carried by said upper section when it occupies its supported final closed position.

References Cited

UNITED STATES PATENTS 2,913,140 11/1959 Vuillemenot _____ 220—60
3,383,009 5/1968 Weikert _____ 220—60

JAMES B. MARBERT, *Primary Examiner.*